(12) United States Patent
Dalsgaard et al.

(10) Patent No.: US 12,445,925 B2
(45) Date of Patent: Oct. 14, 2025

(54) ENHANCED BEAM SWITCHING

(71) Applicant: Nokia Technologies Oy, Espoo (FI)

(72) Inventors: Lars Dalsgaard, Oulu (FI); Dimitri Gold, Espoo (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 341 days.

(21) Appl. No.: 18/165,491

(22) Filed: Feb. 7, 2023

(65) Prior Publication Data

US 2023/0268979 A1    Aug. 24, 2023

Related U.S. Application Data

(60) Provisional application No. 63/312,258, filed on Feb. 21, 2022.

(51) Int. Cl.
*H04B 7/0408* (2017.01)
*H04B 7/08* (2006.01)
(Continued)

(52) U.S. Cl.
CPC ........ *H04W 36/085* (2023.05); *H04B 7/0408* (2013.01); *H04B 7/088* (2013.01);
(Continued)

(58) Field of Classification Search
CPC ... H04B 7/02–12; H04B 17/0082–3913; H04J 11/0023–0093;
(Continued)

(56) References Cited

U.S. PATENT DOCUMENTS

| 2019/0081675 | A1 | 3/2019 | Jung et al. |
| 2020/0169303 | A1 | 5/2020 | Park et al. |
| 2021/0185512 | A1* | 6/2021 | Zhou ................... H04W 72/046 |

FOREIGN PATENT DOCUMENTS

| CN | 110521139 A | 11/2019 |
| CN | 111713040 A | 9/2020 |

(Continued)

OTHER PUBLICATIONS

International Search Report and Written Opinion received for corresponding Patent Cooperation Treaty Application No. PCT/FI2023/050028, dated Apr. 4, 2023, 15 pages.
(Continued)

*Primary Examiner* — Timothy J Weidner
(74) *Attorney, Agent, or Firm* — SQUIRE PATTON BOGGS (US) LLP

(57) ABSTRACT

Systems, methods, apparatuses, and computer program products for enhanced beam switching. A method may include informing a network element about a user equipment type and capability in beam switching from a source beam to a target beam. The method may further include receiving a request from the network element to switch from the source beam to the target beam. The method may also include based on the user equipment type and capability, receiving a reference signal for timing adjustment with the target beam. In addition, the method may include switching from the source beam to the target beam. Further, the method may include adjusting the time or frequency tracking of the target beam after the switching based the reference signal.

20 Claims, 7 Drawing Sheets

(51) Int. Cl.
  *H04B 17/20* (2015.01)
  *H04L 5/00* (2006.01)
  *H04W 8/22* (2009.01)
  *H04W 24/10* (2009.01)
  *H04W 36/08* (2009.01)
  *H04W 56/00* (2009.01)
  *H04W 72/044* (2023.01)
  *H04W 84/02* (2009.01)
  *H04W 88/02* (2009.01)
  *H04W 88/08* (2009.01)
  *H04W 92/02* (2009.01)
  *H04W 92/10* (2009.01)

(52) U.S. Cl.
  CPC ......... *H04B 17/201* (2023.05); *H04B 17/252* (2023.05); *H04L 5/0051* (2013.01); *H04L 5/0098* (2013.01); *H04W 8/22* (2013.01); *H04W 24/10* (2013.01); *H04W 56/0015* (2013.01); *H04W 72/046* (2013.01); *H04W 84/02* (2013.01); *H04W 88/02* (2013.01); *H04W 88/08* (2013.01); *H04W 92/02* (2013.01); *H04W 92/10* (2013.01)

(58) Field of Classification Search
  CPC .. H04J 2011/0003–0096; H04L 5/0001–0098; H04W 8/22–245; H04W 16/24–32; H04W 24/02–10; H04W 28/02–26; H04W 36/0005–385; H04W 56/0005–0095; H04W 72/02–569; H04W 84/02–16; H04W 88/02–12; H04W 92/02–04; H04W 92/10
  See application file for complete search history.

(56) References Cited

FOREIGN PATENT DOCUMENTS

| | | | |
|---|---|---|---|
| CN | 113940114 A | 1/2022 | |
| EP | 3 799 327 A1 | 3/2021 | |
| WO | 2021/161143 A1 | 8/2021 | |
| WO | WO-2022027012 A1 * | 2/2022 | .......... H04W 72/046 |

OTHER PUBLICATIONS

"Discussion on TCI State Switching Requirements", 3GPP TSG-RAN WG4 Meeting #90bis, R4-1902937, Agenda item: 6.10.7.4.1, Intel Corporation, Apr. 8-12, 2019, 6 pages.

"Remaining Details on QCL", 3GPP TSG RAN WG1 Meeting AH 1801, R1-1800867, Agenda item: 7.2.3.7, Qualcomm Incorporated, Jan. 22-26, 2018, pp. 1-8.

"New WID on Further NR mobility enhancements", 3GPP TSG RAN Meeting #94e, RP-213565, Agenda Item: 8A.2, MediaTek, Dec. 6-17, 2021, 5 pages.

"Introduction of TRS based SCell activation", 3GPP TSG-RAN WG2 Meeting #116bis electronic, R2-2201713, OPPO, Jan. 17-25, 2022, 7 pages.

"Introduction of TRS based SCell activation-38331", 3GPP TSG-RAN WG2 Meeting #116bis electronic, R2-2201714, OPPO, Jan. 17-25, 2022, 6 pages.

Extended European Search Report received for corresponding European Patent Application No. 23151243.5, dated Jun. 26, 2023, 7 pages.

Office Action received for corresponding European Patent Application No. 23151243.5, dated Apr. 3, 2025, 6 pages.

The First Office Action dated Jun. 25, 2025 corresponding to Chinese Patent Application No. 202310144977X, with English translation thereof.

Communication pursuant to Article 94(3) EPC dated Aug. 12, 2025 corresponding to European Patent Application No. 23151243.5.

* cited by examiner

ENHANCED BEAM SWITCHING

CROSS REFERENCE TO RELATED APPLICATION

This application claims priority from U.S. provisional patent application No. 63/312,258 filed on Feb. 21, 2022. The contents of this earlier filed application are hereby incorporated by reference in their entirety.

FIELD

Some example embodiments may generally relate to mobile or wireless telecommunication systems, such as Long Term Evolution (LTE) or fifth generation (5G) new radio (NR) access technology or 5G beyond, or other communications systems. For example, certain example embodiments may relate to apparatuses, systems, and/or methods for enhanced beam switching.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include informing a network element about a user equipment type capability in beam switching from a source beam to a target beam. The method may further include receiving a request from the network element to switch from the source beam to the target beam. The method may also include, based on the user equipment type and capability, receiving a reference signal for time or frequency tracking with the target beam. In addition, the method may include switching from the source beam to the target beam. Further, the method may include adjusting the time or frequency tracking of the target beam after the switching based on the reference signal.

Other example embodiments may be directed to an apparatus. The apparatus may include at least one processor and at least one memory including computer program code. The at least one memory and computer program code may also be configured to, with the at least one processor, cause the apparatus at least to inform a network element about a user equipment type and capability in beam switching from a source beam to a target beam. The apparatus may further be caused to receive a request from the network element to switch from the source beam to the target beam. The apparatus may also be caused to, based on the user equipment type and capability, receiving a reference signal for time and frequency tracking with the target beam. In addition, the apparatus may be caused to switch from the source beam to the target beam. Further, the apparatus may be caused to adjust the time or frequency tracking of the target beam after the switching based on the previous tracking timing or the reference signal.

Other example embodiments may be directed to an apparatus. The apparatus may include means for informing a network element about a user equipment type and capability in beam switching from a source beam to a target beam. The apparatus may further include means for receiving a request from the network element to switch from the source beam to the target beam. The apparatus may also include means for, based on the user equipment type and capability, receiving a reference signal for time or frequency tracking with the target beam. In addition, the apparatus may include means for switching from the source beam to the target beam. Further, the apparatus may include means for adjusting the time or frequency tracking of the target beam after the switching based on the previous tracking timing or the reference signal.

In accordance with other example embodiments, a non-transitory computer readable medium may be encoded with instructions that may, when executed in hardware, perform a method. The method may include informing a network element about a user equipment type and capability in beam switching from a source beam to a target beam. The method may further include receiving a request from the network element to switch from the source beam to the target beam. The method may also include, based on the user equipment type and capability, receiving a reference signal for time or frequency tracking with the target beam. In addition, the method may include switching from the source beam to the target beam. Further, the method may include adjusting the time or frequency tracking of the target beam after the switching based on the previous tracking timing or the reference signal.

Other example embodiments may be directed to a computer program product that performs a method. The method may include informing a network element about a user equipment type and capability in beam switching from a source beam to a target beam. The method may further include receiving a request from the network element to switch from the source beam to the target beam. The method may also include, based on the user equipment type and capability, receiving a reference signal for time or frequency tracking with the target beam. In addition, the method may include switching from the source beam to the target beam. Further, the method may include adjusting the time or frequency tracking of the target beam after the switching based on t the reference signal.

Other example embodiments may be directed to an apparatus that may include circuitry configured to inform a network element about a user equipment type and capability in beam switching from a source beam to a target beam. The apparatus may further include circuitry configured to receive a request from the network element to switch from the source beam to the target beam. The apparatus may also include circuitry configured to, based on the user equipment type and capability, receiving a reference signal for time or frequency tracking with the target beam. In addition, the apparatus may include circuitry configured to switch from the source beam to the target beam. Further, the apparatus may include circuitry configured to adjust the time or frequency tracking of the target beam after the switching based on the reference signal.

Certain example embodiments may be directed to a method. The method may include receiving an indication from a user equipment identifying a user equipment type and capability in beam switching between a source beam and a target beam. The method may also include selecting the user equipment for configuration for time or frequency tracking based on the user equipment type. In addition, the method may include transmitting a request to the user equipment to switch from a source beam to a target beam. The method may further include determining whether to transmit a reference signal to the user equipment for time or frequency tracking with the target beam based on the user equipment type and capability. Further, the method may include receiving communication from the user equipment via the target beam.

Other example embodiments may be directed to an apparatus. The apparatus may include at least one processor and at least one memory including computer program code. The at least one memory and computer program code may be configured to, with the at least one processor, cause the apparatus at least to receive an indication from a user equipment identifying a user equipment type and capability in beam switching between a source beam and a target beam. The apparatus may also be caused to select the user equipment for configuration for time or frequency tracking based on the user equipment type. In addition, the apparatus may be caused to transmit a request to the user equipment to switch from a source beam to a target beam. The apparatus may further be caused to determine whether to transmit a reference signal to the user equipment for time or frequency tracking with the target beam based on the user equipment type and capability. Further, the apparatus may be caused to receive communication from the user equipment via the target beam.

Other example embodiments may be directed to an apparatus. The apparatus may include means for receiving an indication from a user equipment identifying a user equipment type and capability in beam switching between a source beam and a target beam. The apparatus may also include means for selecting the user equipment for configuration for time or frequency tracking based on the user equipment type. In addition, the apparatus may include means for transmitting a request to the user equipment to switch from a source beam to a target beam. The apparatus may further include means for determining whether to transmit a reference signal to the user equipment for time or frequency tracking with the target beam based on the user equipment type. Further, the apparatus may include means for receiving communication from the user equipment via the target beam.

In accordance with other example embodiments, a non-transitory computer readable medium may be encoded with instructions that may, when executed in hardware, perform a method. The method may include receiving an indication from a user equipment identifying a user equipment type and capability in beam switching between a source beam and a target beam. The method may also include selecting the user equipment for configuration for time or frequency tracking based on the user equipment type. In addition, the method may include transmitting a request to the user equipment to switch from a source beam to a target beam. The method may further include determining whether to transmit a reference signal to the user equipment for timing adjustment with the target beam based on the user equipment type and capability. Further, the method may include receiving communication from the user equipment via the target beam.

Other example embodiments may be directed to a computer program product that performs a method. The method may include receiving an indication from a user equipment identifying a user equipment type and capability in beam switching between a source beam and a target beam. The method may also include selecting the user equipment for configuration for time or frequency tracking based on the user equipment type. In addition, the method may include transmitting a request to the user equipment to switch from a source beam to a target beam. The method may further include determining whether to transmit a reference signal to the user equipment for time or frequency tracking with the target beam based on the user equipment type and capability. Further, the method may include receiving communication from the user equipment via the target beam.

Other example embodiments may be directed to an apparatus that may include circuitry configured to receive an indication from a user equipment identifying a user equipment and capability in beam switching between a source beam and a target beam. The apparatus may also include circuitry configured to select the user equipment for configuration for time or frequency tracking based on the user equipment type. In addition, the apparatus may include circuitry configured to transmit a request to the user equipment to switch from a source beam to a target beam. The apparatus may further include circuitry configured to determine whether to transmit a reference signal to the user equipment for time or frequency tracking with the target beam based on the user equipment type and capability. Further, the apparatus may include circuitry configured to receive communication from the user equipment via the target beam.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for enhanced beam switching.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments. Further, the terms "cell", "node", "gNB", or other similar language throughout this specification may be used interchangeably.

3$^{rd}$ Generation Partnership Project (3GPP) defines certain requirements related to user equipment (UE) behavior in a high speed train (HST) scenario when operating at higher frequencies (e.g., frequency range 2 (FR2)). 3GPP also defines minimum requirements for the UE in a high speed scenario. This scenario is not limited to HST, and may also be applicable for other higher velocity scenarios when operating at high carrier frequencies.

When operating at higher carrier frequencies, the UE or network, or both, may need to use direction beam steering (beamforming) to improve the link budget to ensure larger cell coverage. Applying beamforming (or just beams) may introduce directionality of the uplink (UL) and downlink (DL) signals. Thus, the UE may need to steer its receiving beam (Rx spatial settings) such that in the best case, there may be maximum reception gain (UE Rx beam is directed towards the gNB Tx beam) while the network optimizes its DL transmission beam. With the optimization of the DL transmission beam, it may be possible to direct the transmitted energy towards the UE as much as possible. Additionally, the UE Rx settings and gNB Tx settings may be well/perfectly aligned, which leads to optimum link performance. Deviations from the perfect beam alignment may lead to some level of more or less degradation of the link performance. Thus, it may have a negative impact on the data throughput (TP) in UL and/or DL.

Figure 1:
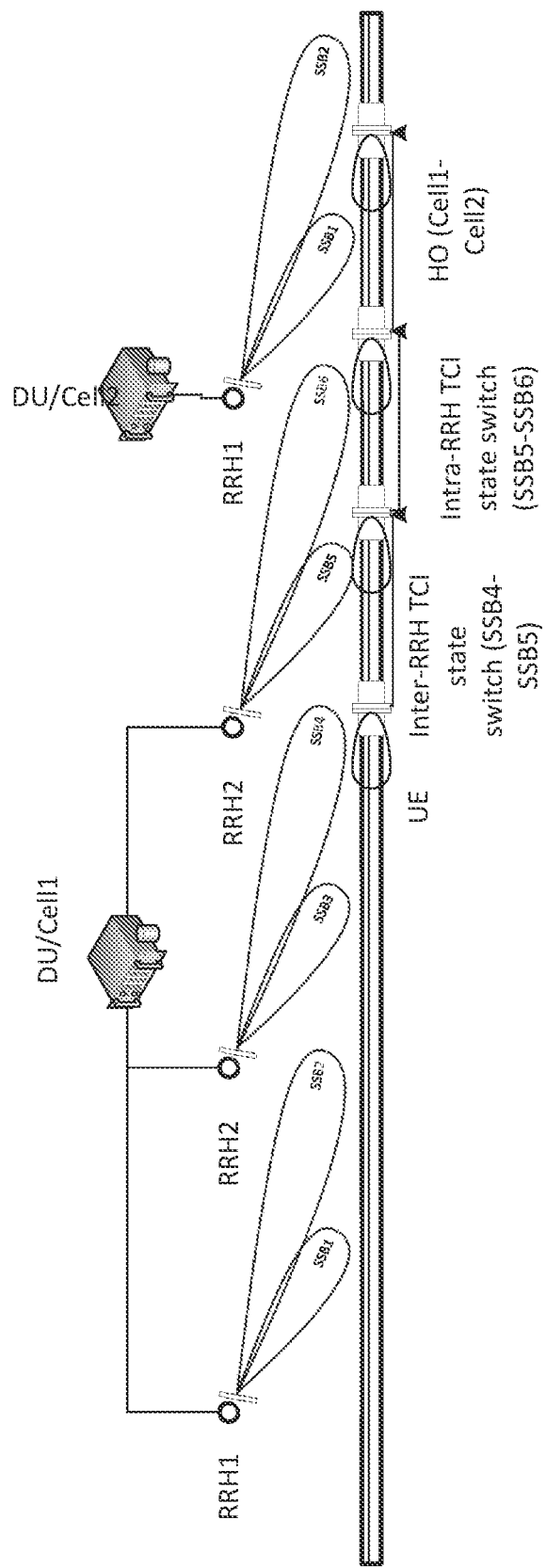
FIG. 1 illustrates an example of downlink (DL) beam changes in a high speed train (HST) scenario.

FIG. 1 illustrates an example of DL beam changes in a HST scenario. In particular, FIG. 1 demonstrates DL beam changes due to HO between cells and collocated TCI/beam switch within one RRH and non-collocated, for example, in between RRHs. For instance, in an HST scenario, the baseline deployment may make use of a number of cells deployed along the train track. Each cell may include one or more remote radio heads (RRHs), which may be connected to one distributed unit (DU) that handles the physical resource scheduling. A change between cells may be accomplished using a legacy handover (HO) procedure, while the change between the RRHs within the same cell may be handled by beam switches. Additionally, beam switching (network controlled) may be referred to as transmission configuration indicator (TCI) state switching in NR. However, in general, it may be a change of the serving DL beam from RRH1 to use a new target DL beam from the same or a different RRH and/or cell. FIG. 1 demonstrates DL beam changes due to HO between cells and collocated TCI/beam switch within one RRH and non-collocated, for example, in between RRHs.

A problem may arise in beam switching in the FR2 HST scenario. The problem may be general and not only related to a beam switch/change with FR2 HST scenario, but may also be present in other similar scenarios such as, for example, multiple transmission point (mTRP) transmission, inter-cell beam management (ICBM), and lower layer mobility (i.e., L1/L2 mobility).

Figure 2:
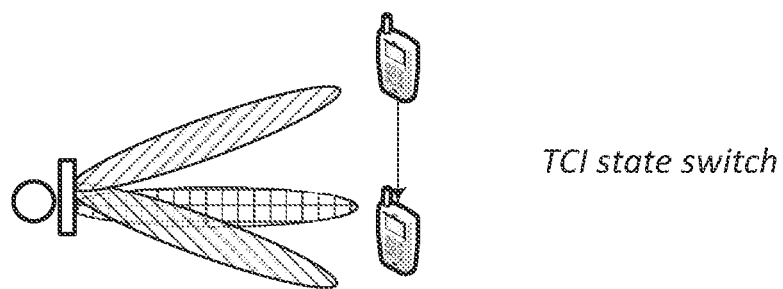
FIG. 2 illustrates an example of (quasi-)collocated transmission control information (TCI) state switch.

FIG. 2 illustrates an example of (quasi-)collocated (intra-RRH) transmission control information (TCI) state switch. In particular, as illustrated in the example of FIG. 2, for an intra-RRH case, a TCI state switch may be based on the principle that the source (transmission origin) of all the beams used for beam switching would be (quasi-)collocated (i.e. they are connected to the same DU and/or same RRH) so that network can handle beam switching via implementation. This basic principle also meant that the UL/DL delays before and after beam switch could be assumed to be unchanged (or at a level any change would be insignificant, and at least not so large that it would cause problems, and the beam controlling entity could handle them).

Figure 3:
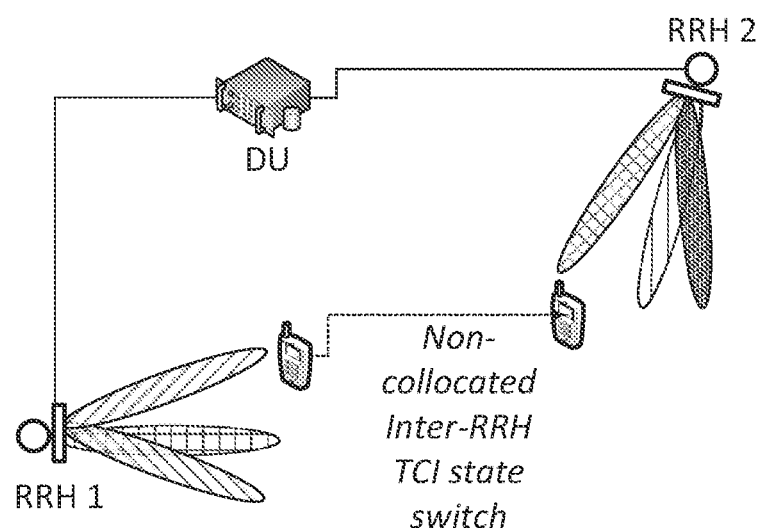
FIG. 3 illustrates an example of non-collocated TCI state switch.

FIG. 3 illustrates an example of non-collocated (inter-RRH) TCI state switch. For FR2 HST, the basic assumption noted above may no longer hold true. In particular, due to the UE speed, changes between RRHs may be impossible to manage even if they are within the same DU. Thus, it may no longer be assumed that the origin (source) of the serving beam and the target beam would always be (quasi-) collocated. Accordingly, there is a need to address beam change between non-collocated RRHs—and in general beam change between non-collocated serving and target beam (e.g., RRH, TRP, cells or similar).

When assuming that any beam switch/change (TCI state change) is within the same cell (or having same origin) and assuming collocation, source and target beams may be assumed to have the same DL/UL timing used in the serving beam before the beam change, and in the target beam (TCI state) after the beam change. If considering non-collocated RRHs—or in general non-collocated serving and target source of the beam—this assumption no longer holds true. Thus, the DL/UL timing may not be the same in the target beam and in the source beam as they are not collocated. Whether the timing would be the same or not may depend on many UE dependent conditions such as relative location of the UE and serving/target beam, reflection etc. With high probability, these effects may cause the DL/UL timing used in the serving beam to not be readily used in the target beam.

In some cases, when the UE has to change from a serving to a non-collocated target beam, the UE may need to acquire the timing of the target beam before the UE is capable of receiving and transmitting in the target beam. Acquisition of the target timing is not a trivial issue for all UEs, and, thus, some UEs may need to perform additional time and frequency tracking in the target—after the TCI switch—to ensure accurate DL time/frequency tracking before the UE is able to receive and/or transmit in the target beam.

To facilitate time/frequency tracking in the target beam the UE may appropriate a DL reference signal (RS). Unfortunately, however, this may increase the beam change delay, which may have negative impact on the system performance. Accordingly, enhancements may be beneficial for reducing the time needed for time/frequency tracking in the target beam (RRH or cell). Similar problems may also arise in other scenarios such as in a multi TRP (mTRP) scenario, ICBM, and L1/L2 mobility where reduction of the beam change delay is beneficial.

According to certain example embodiments, a method may be provided wherein a beam switch (for UL and/or DL) triggers transmission of one or more reference signals (each of which may use different QCL assumptions), which can be used by the UE for time/frequency tracking in the target beam/TCI state after the TCI switch (beam switch). According to some example embodiments, the trigger of the (aperiodic or burst of periodic) channel state information reference symbols (CSI-RS) (or tracking reference signal (TRS)) may be done such that, when the UE is requested to perform a beam change (TCI state switch) from a source to a target beam, the network may initiate transmission of the reference signal in the target beam (TCI state). In other example embodiments, the reception of the DL TRS may also trigger the UE to send an UL signal (e.g., sounding reference signal (SRS)) transmission using the target beam. In other example embodiments, the TCI state change may also trigger the UE to send an UL signal (e.g., SRS) transmission using the target beam (TCI state). In certain example embodiments, the same or similar mechanism may be used for (quasi-)collocated and non-collocated cases. For instance, the signal transmission may be used to allow both the UE and the network to obtain synchronization to be the correct beam.

Figure 4:
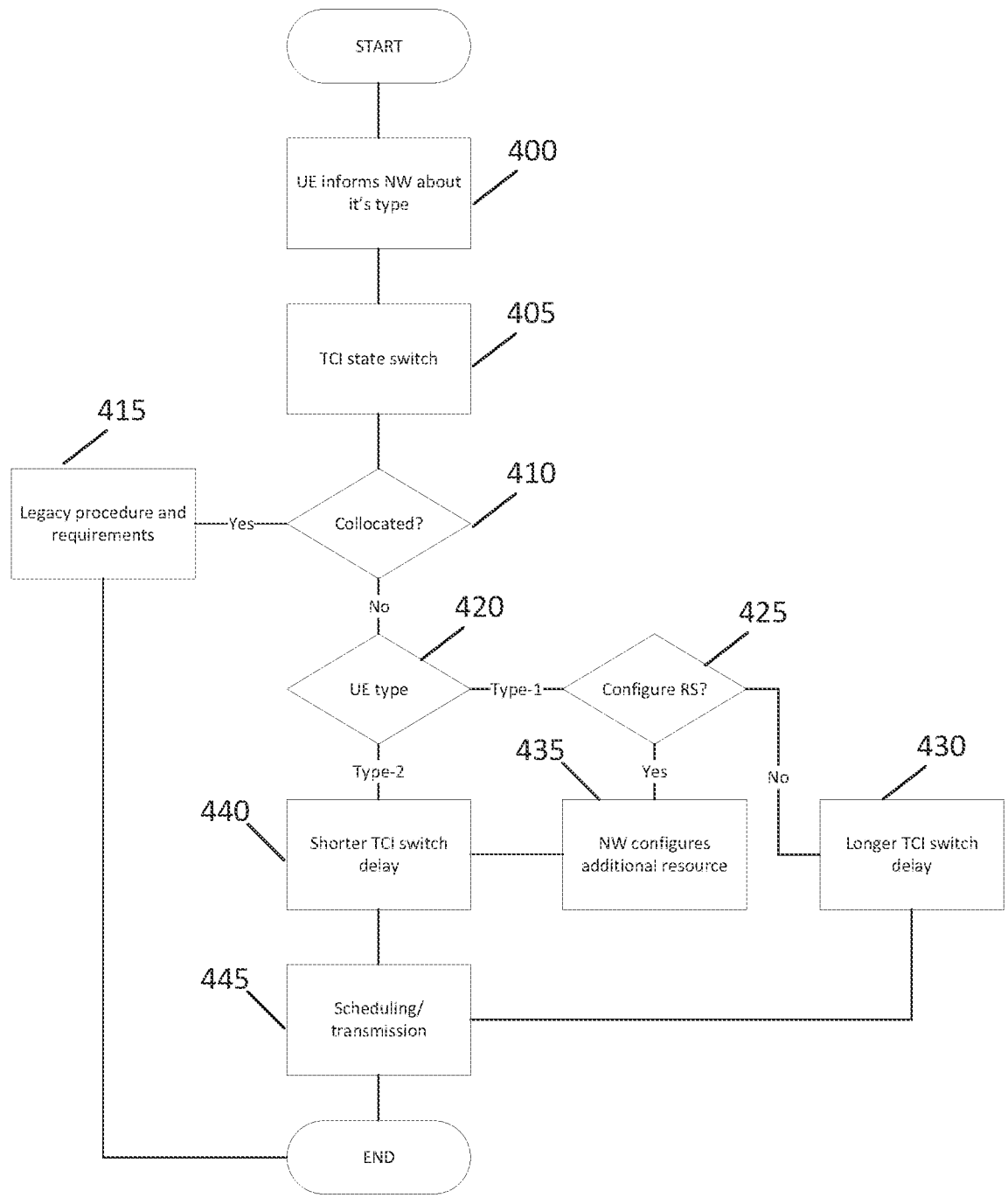
FIG. 4 illustrates an example flow diagram of an enhanced beam switch, according to certain example embodiments.

FIG. 4 illustrates an example flow diagram of an enhanced beam switch, according to certain example embodiments. As illustrated in FIG. 4, at 400, the UE may inform the network (NW) about it's type (e.g., UE type-1 or UE type-2). As such, the NW may be aware of which UEs would need such assistance timing RS (e.g., based on UE capabilities). According to certain example embodiments, there may be a type-1 UE which does not need additional time tracking in the target beam even if this is not considered collocated with the source TCI state. If the UE is a type-2 UE, it may need additional time/frequency tracking assistance in the target beam after a TCI switch (operation 405) for the case where the source and target are not considered collocated. For instance, at 410, a determination may be made as to whether the source beam and the target beam are collocated. If yes, at 415, the legacy procedure and requirements may be applied. However, if the source beam and the target beams are not collocated, at 420, the UE may be of type-1 or type-2.

If the UE is of type-1, at 430, it may not be configured with RS (operation 425), which may result in a longer TCI switch delay compared to a type-2 UE. However, if the UE type-1 is configured with RS, at 435, the NW may configure the UE with additional resources. On the other hand, if the UE is of type-2, at 440, there may be a shorter TCI switch delay. At 445, the NW may schedule the UE for transmission.

As noted above, in certain example embodiments, based on the UE type, the NW may (optionally) configure the UE type-2 with the necessary resources for time and/or frequency tracking after a beam switch when the beam switch includes switching between two beams which sources are not considered collocated. The NW may also choose not to configure these additional RSs. In certain example embodiments, the NW may still benefit from knowing the UE type as this may make the NW aware of the longer TCI state switch delay.

According to certain example embodiments, the NW may trigger a TCI state change. In such a case, the source and target may be (quasi-)collocated, and there may be no change compared to legacy procedures and requirements. According to other example embodiments, the source and target may be considered not (quasi-) collocated. In this case, after a predefined delay, the NW may initiate transmission of the time/frequency tracking RS (e.g., TRS) in the target TCI state. Additionally, the UE may receive and process the TRS and use the results to adjust the UE fine time and/or frequency tracking of the target beam. For instance, in certain example embodiments, the TRS may have high density (e.g., occupy 3 out of 12 resource elements within a resource block) in the frequency domain and wider bandwidth than SSB signals. Such configuration may help ensure that the UE remains time and frequency synchronized with higher/finer accuracy than SSB-based synchronization (i.e., coarse synch). According to some example embodiments, the NW may trigger SRS transmission towards the NW by using the target beam information (if, for example, both UL and DL TCI states were changed in ICBM, the UE may use the new target TCI state for sending the SRS transmission, and the NW may receive it based on the knowledge of the timing UE uses). In such example embodiments, the UE may be scheduled to receive and transmit in the target beam. In other example embodiments, if the NW does not schedule additional TRS in the target beam after the TCI switch (i.e., UE is not configured with such resources), the UE may resume to using other time tracking signal(s) such as in legacy procedures (e.g., SSB2). In this case, the NW may be aware of the additional delay, and may consider this in the scheduling.

Figure 5:
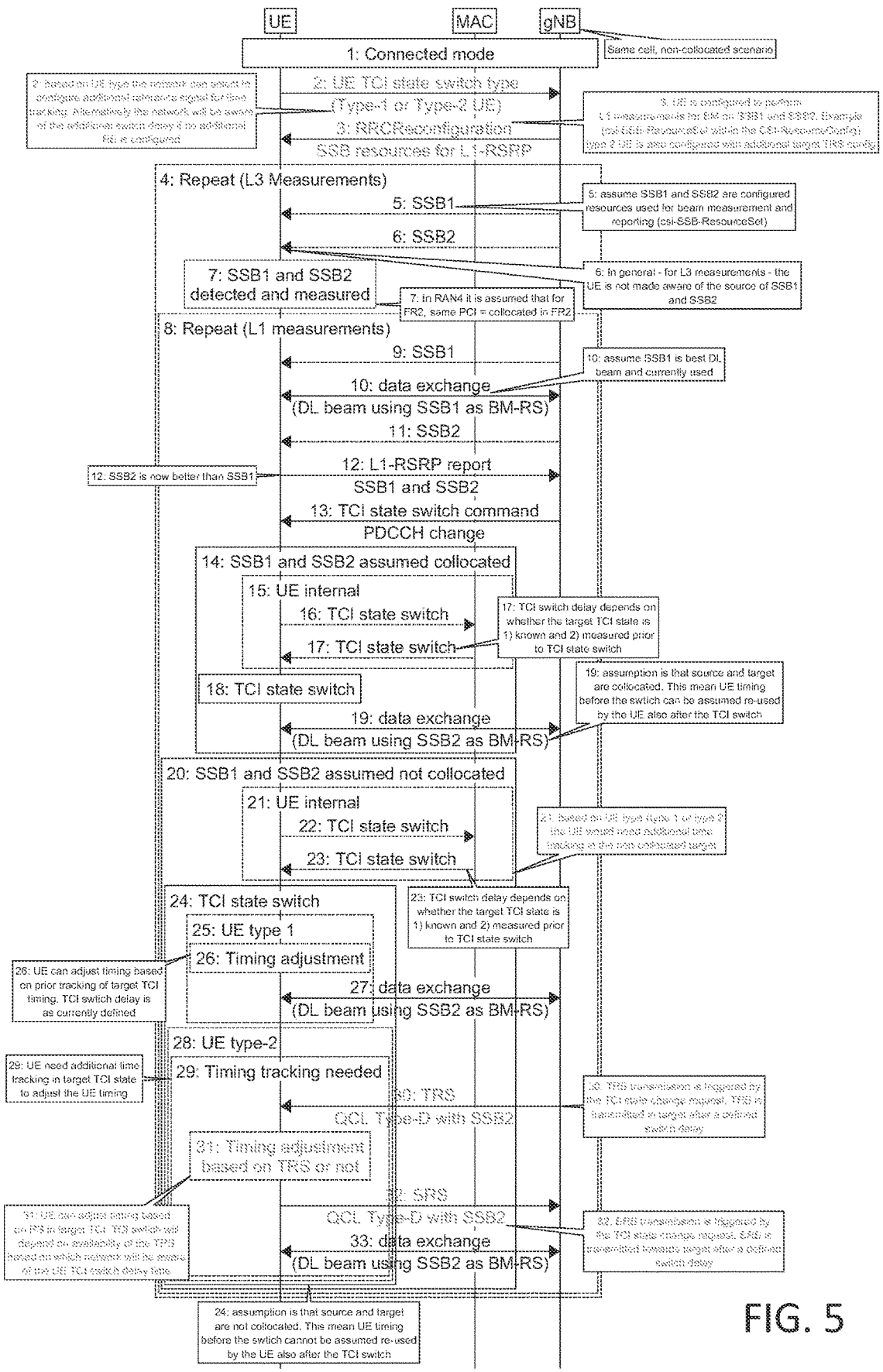
FIGS. 5 (A), (B), (C), and (D) illustrates an example signaling diagram, according to certain example embodiments.

FIGS. 5 (A), (B), (C), and (D) illustrates an example signaling diagram, according to certain example embodiments. The example signaling diagram of FIGS. 5 (A), (B), (C), and (D) may use the physical downlink control channel (PDCCH) TCI change as an example. However, the signaling diagram is not limited to such a case. In certain example embodiments, it may be assumed that the change of TCI state may be performed using a medium access control control element (MAC CE) command. In other example embodiments, whether SSB1 and SSB2 are collocated is not specifically assumed. Instead, in certain example embodiments, one or multiple SSBs may be configured per RRH, and certain example embodiments described herein may be applicable for collocated cases where timing of DL or UL power needs to be confirmed.

As illustrated in FIGS. 5 (A), (B), (C), and (D), at 1, the UE and gNB (i.e., network (NW)) may be in connected mode. At 2, while in connected mode, the UE may indicate to the NW its UE type so that the NW may be aware of whether the UE is a type-1 UE or a type-2 UE. According to certain example embodiments, if the UE is a type-1 UE, it may not need additional time and/or frequency tracking RS after a non-collocated beam switch (i.e., when the source and target beams are not collocated). If the UE is a type-2 UE, then the UE may need additional RS after a beam switch to a beam (e.g., source beam to target beam) which is not collocated to the source beam for time and/or frequency tracking for reduced beam switch time. Alternatively, in other example embodiments, the UE may not be configured with additional RS, and therefore may need additional beam switch time to allow the UE to acquire one or more (legacy—thus, not additionally configured) RS from the target beam for fine time and/or frequency tracking. Thus, the NW may be aware of the additional switch delay if no additional RS is configured.

At 3, the NW may select to configure the UE (both type-1 and type-2) to perform layer-1 reference signal received power (L1-RSRP) measurements using SSB1 and SSB2. For instance, (CSI-SSB-ResourceSet within the CSI-ResourceConfig) type-2 UE may be configured with additional target TRS configuration(s). In some example embodiments, the NW may configure the UE with the additional RS, however, the additional RS may be transmitted at beam switch. Additionally, the NW may configure the type-2 UE with the additional RS for fine time and/or frequency tracking of a target beam (here identified by SSB2) for the case where the target beam (SSB2) is considered as not being collocated with the origin of the current source beam (SSB1). The NW may also choose not to configure the additional RS to the UE.

At 4, L3 measurements may be repeated. At 5 and 6, once configured, the UE may continue to perform the necessary L3 measurements including detection and measurements of cells and SSBs per cell. For instance, at 5, SSB1 and SSB2 may be assumed to be configured resources used for beam measurement and reporting (CSI-SSB-ResourceSet). Further, at 6, for L3 measurements, the UE may not be made aware of the source of SSB1 and SSB2. At 7, SSB1 and SSB2 may be detected and measured by the UE. At 8 and 9, if the UE detects an SSB for which the UE is also configured to perform L1 measurement, the UE may initiate L1 measurements related to the SSB. At 9, data exchange may take place between the UE and the NW. For example, in this case, as the current active DL beam (TCI state) is based on SSB1 as DL RS (in this beam using the SSB1 as beam-management radio resources (BM-RS) the data exchange with the NW occurs), the UE may perform L1 measurements on SSB2. As illustrated in FIG. 5(B), this may be done at operation 13.

At 12 and 13, the UE may send an L1-RSRP measurement report to the NW. According to certain example embodiments, the report may indicate to the NW that the L1 measurements on SSB2 are better than those of SSB1. Based on this report, the NW may decide to request the UE to switch to the TCI state based on SSB1 to the TCI state based on SSB2 as BM-RS. At box 14, the TCI state switch illustrates the current switching procedure. This TCI state switch and UE delays may be based on (for FR2) that the origin of SSB1 and SSB2 can be considered as being collocated. Thus, the UE may assume to use the same time and/or frequency tracking in the source and target beams.

At box 15, the UE may internally process the TCI state switch command at 16, and 17. Further, at 17, the TCI switch delay may depend on whether the target TCI state is known and measured prior to the TCI state switch. At 18, the UE may perform the TCI state switch from the source to the target beam. At 19, the UE and NW may engage in data exchange (e.g., DL beam using SSB2 as BM-RS). According to certain example embodiments, at 19, it may be assumed that the source and target beams are collocated. This means that the UE timing before the switch may be assumed to be re-used by the UE after the TCI switch.

At box 20, collocation assumption is no longer the case. instead, in this case, the source and target origin may not be considered as being collocated. In box 21, based on the TCI switch command at 13, the UE may internally process the TCI switch command at 22 and 23. Further, based on the UE type (type-1 or type-2), the UE may need additional RS in the target for time and/or frequency tracking in the target beam (box 28), or the UE may not need the additional RS (box 25). At box 25, if the UE does not need the additional time and/or frequency tracking in the target beam, it may internally adjust the UE timing to align with the new beams DL timing (at 26). In other example embodiments, the UE may adjust the timing based on prior tracking of the target TCI timing. Further, the TCI switch delay may be the same as it is currently defined. After the adjustment, the UE may be capable of receiving and transmitting in the target beam (at 27). In this case, the existing beam switch delays may already be defined, and may be readily applied.

At box 28, the UE type may be considered as type-2, which would mean that the type-2 UE may need either additional RS for time and/or frequency tracking (to adjust the UE timing) in the new target beam, or may need additional time for the beam switch due to using existing DL RS for time and/or frequency tracking when switching to the new target beam. In certain example embodiments, the NW may configure the type-2 UE. For example, if the NW has configured the type-2 UE (at operation 3) with the additional RS for time and/or frequency tracking when switching to a beam that is not collocated as the source beam, the UE may switch to the target beam and receive the configured RS for time and/or frequency tracking (operations 29, and 30). According to certain example embodiments, at 30, the TRS transmission may be triggered by the TCI state change request (e.g., operation 13), and the TRS may be transmitted in the target beam after a defined switch delay. At 31, with the RS, the UE may adjust the UE timing to align with the new target beam's DL timing. Further, at 31, the UE may adjust the timing based on the RS in the target TCI where the TCI switch may depend on the availability of the TRS based on which NW will be aware of the UE TCI switch delay time. At 32 and 33, after the adjustment, the UE may be capable of receiving and transmitting in the target beam. According to certain example embodiments, at 32, SRS transmission may be triggered by the TCI state change request (operation 13), and the SRS may be transmitted toward the target after a defined switch delay.

In other example embodiments, if the NW has not configured (in operation 3) the UE with the additional RS for time and/or frequency tracking when switching to a beam that is not collocated as the source beam, the UE may switch to the target beam and receive legacy RS (SSB2) for time and/or frequency tracking. In this case, the UE may adjust the UE timing to align with the new target beam's DL timing. After the adjustment, the UE may be capable of receiving and transmitting in the target beam.

Figure 6:
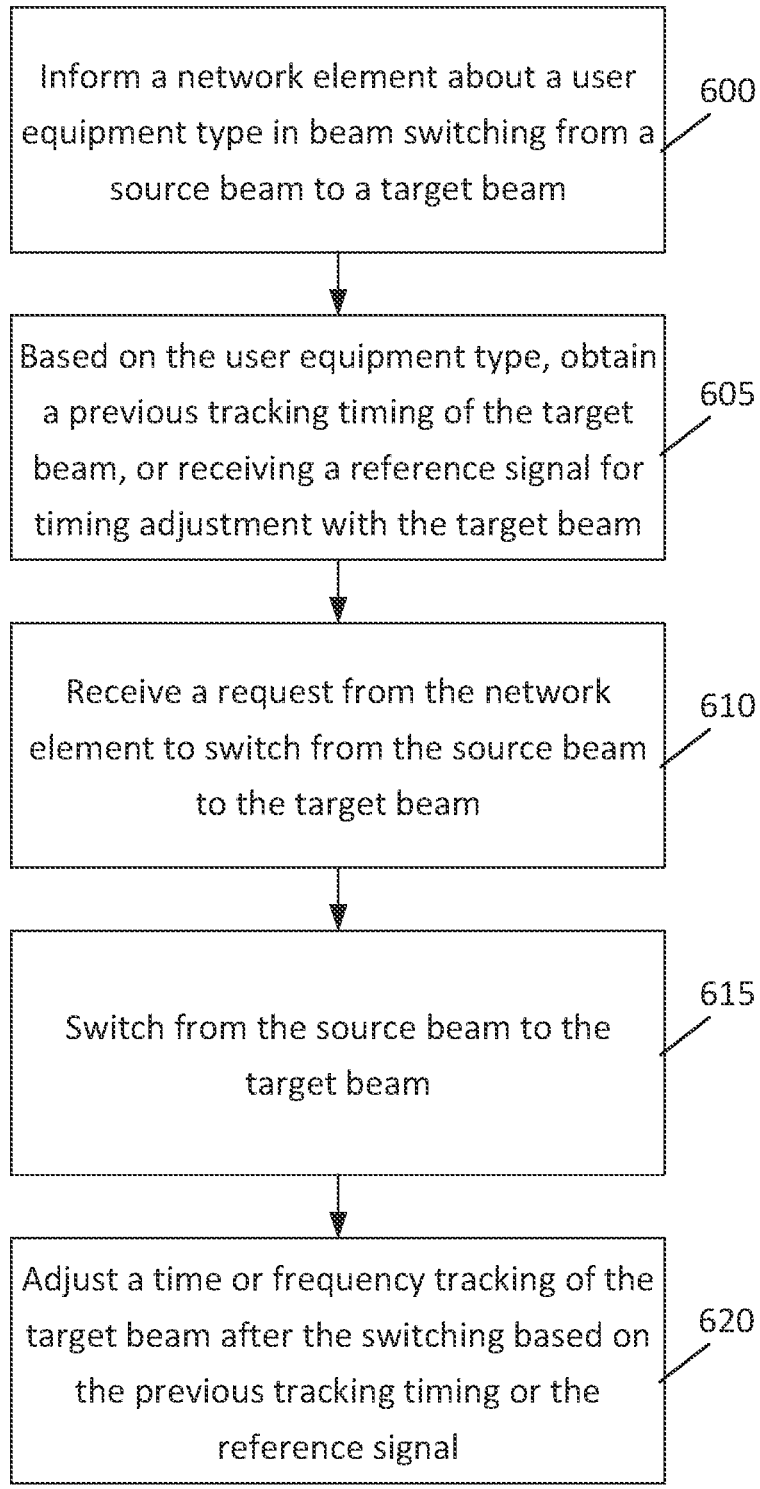
FIG. 6 illustrates an example flow diagram of a method, according to certain example embodiments.

FIG. 6 illustrates an example flow diagram of a method, according to certain example embodiments. In an example embodiment, the method of FIG. 6 may be performed by a network entity, or a group of multiple network elements in a 3GPP system, such as LTE or 5G-NR. For instance, in an example embodiment, the method of FIGS. 5(A), 5(B), 5(C) and 5(D) may be performed by a UE similar to one of apparatuses 10 or 20 illustrated in FIG. 8.

According to certain example embodiments, the method of FIG. 6 may include, at 600 informing a network element about a user equipment type and capability in beam switching from a source beam to a target beam. The method may also include, at 605, receiving a request from the network element to switch from the source beam to the target beam. The method may further include, at 610, based on the user equipment type and capability, receiving a reference signal for timing or frequency tracking with the target beam. In addition, the method may include, at 615, switching from the source beam to the target beam. Further, the method may include, at 620, adjusting a time or frequency tracking of the target beam after the switching based on the reference signal.

According to certain example embodiments, the source beam and the target beam may be collocated. According to some example embodiments, the method may also include receiving, from the network element, configuration to perform layer 1 measurements for beam management on a first synchronization block and a second synchronization block. According to other example embodiments, the request to switch from the source beam to the target beam may be received based on the layer 1 measurements. In certain example embodiments, receipt of the reference signal may be triggered by the request to switch from the source beam to the target beam. In some example embodiments, when the reference signal is received, the method may further include sending a sounding reference signal transmission to the network element via the target beam. In further example embodiments, sending the sounding reference signal transmission may be triggered by the request to switch from the source beam to the target beam.

Figure 7:
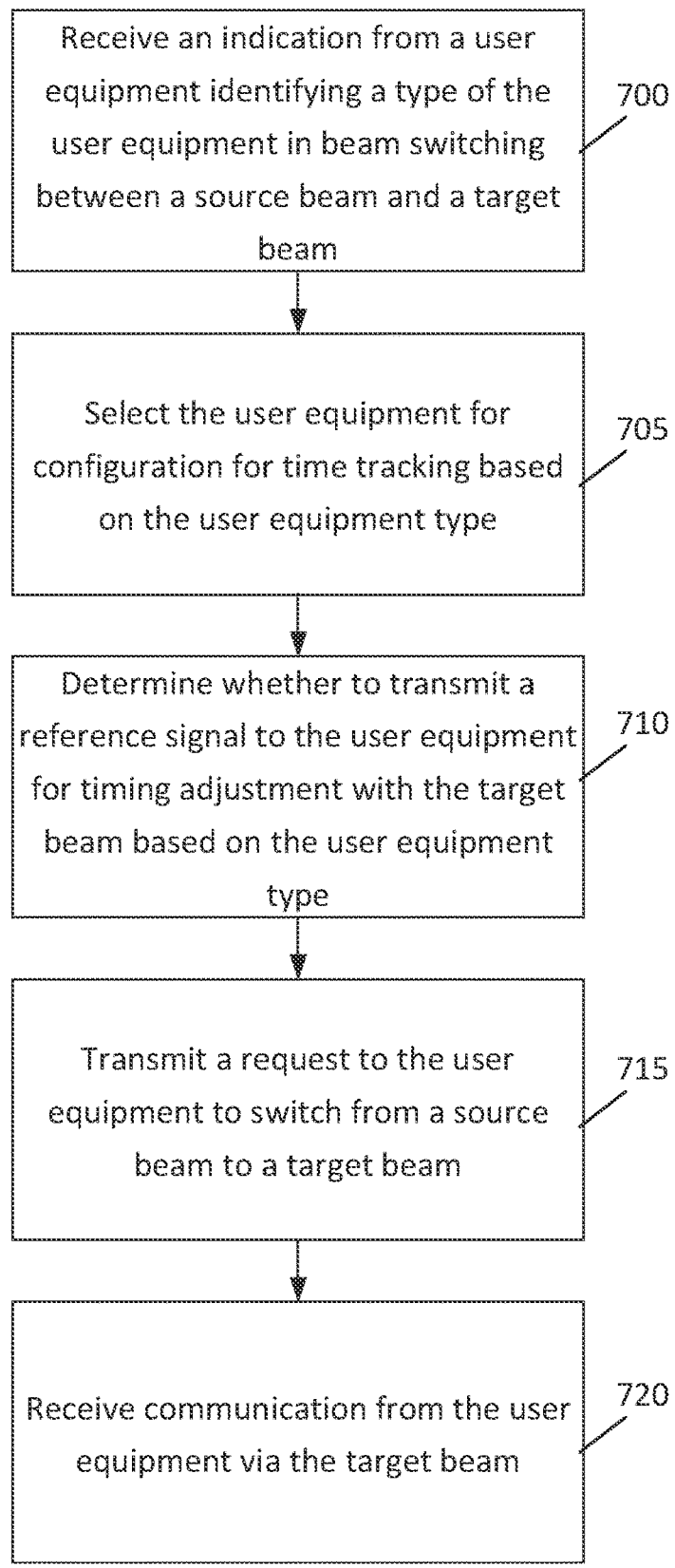
FIG. 7 illustrates an example flow diagram of another method, according to certain example embodiments.

FIG. 7 illustrates an example of a flow diagram of another method, according to certain example embodiments. In an example embodiment, the method of FIG. 7 may be performed by a network entity, or a group of multiple network elements in a 3GPP system, such as LTE or 5G-NR. For instance, in an example embodiment, the method of FIG. 7 may be performed by a network or gNB similar to one of apparatuses 10 or 20 illustrated in FIG. 8.

According to certain example embodiments, the method of FIG. 7 may include, at 700, receiving an indication from a user equipment identifying a user equipment type and capability in beam switching between a source beam and a target beam. The method may also include, at 705, selecting the user equipment for configuration for time or frequency tracking based on the user equipment type. The method may further include, at 710, transmitting a request to the user equipment to switch from a source beam to a target beam. In addition, the method may include, at 715, determining whether to transmit a reference signal to the user equipment for timing or frequency tracking with the target beam based on the user equipment type and capability. Further, the method may include, at 720, receiving communication from the user equipment via the target beam.

According to certain example embodiments, the source beam and the target beam are collocated. According to some example embodiments, the method may also include configuring the user equipment to perform layer 1 measurements for beam management on a first synchronization block and a second synchronization block. According to other example embodiments, the request may be transmitted based on the layer 1 measurements. In certain example embodiments, transmission of the reference signal may be triggered by the request. In some example embodiments, when the reference signal is transmitted to the user equipment, the method may further include receiving a sounding reference signal transmission via the target beam. In other example embodiments, receipt of the sounding reference signal may be triggered by the request.

Figure 8:
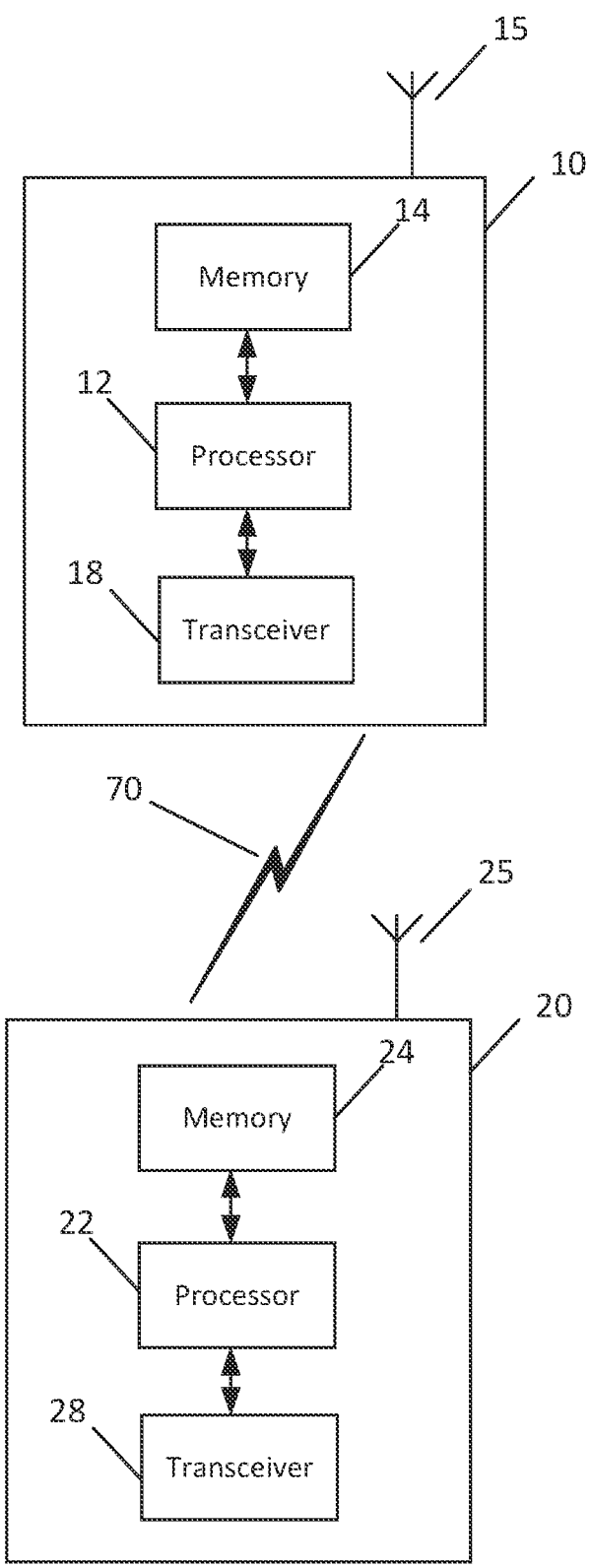
FIG. 8 illustrates a set of apparatuses, according to certain example embodiments.

FIG. 8 illustrates a set of apparatus 10 and 20 according to certain example embodiments. In certain example embodiments, the apparatus 10 may be a node or element in a communications network or associated with such a network, such as a UE, mobile equipment (ME), mobile station, mobile device, stationary device, IoT device, or other device. It should be noted that one of ordinary skill in the art would understand that apparatus 10 may include components or features not shown in FIG. 8.

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8.

As illustrated in the example of FIG. 8, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to inform a network element about a user equipment type in beam switching from a source beam to a target beam. Apparatus 10 may also be controlled by memory 14 and processor 12 to, based on the user equipment type, obtain a previous tracking timing of the target beam, or receiving a reference signal for timing adjustment with the target beam. Apparatus 10 may further be controlled by memory 14 and processor 12 to receive a request from the network element to switch from the source beam to the target beam. In addition, apparatus 10 may be controlled by memory 14 and processor 12 to switch from the source beam to the target beam. Further, apparatus 10 may be controlled by memory 14 and processor 12 to adjust a time or frequency tracking of the target beam after the switching based on the previous tracking timing or the reference signal.

As illustrated in the example of FIG. 8, apparatus 20 may be a network, core network element, or element in a communications network or associated with such a network, such as a gNB. It should be noted that one of ordinary skill in the art would understand that apparatus 20 may include components or features not shown in FIG. 8.

As illustrated in the example of FIG. 8, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5 and 7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5 and 7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

For instance, in certain example embodiments, apparatus 20 may be controlled by memory 24 and processor 22 to receive an indication from a user equipment identifying a type of the user equipment in beam switching between a source beam and a target beam. Apparatus 20 may also be controlled by memory 24 and processor 22 to select the user equipment for configuration for time tracking based on the user equipment type. Apparatus 20 may further be controlled by memory 24 and processor 22 to determine whether to transmit a reference signal to the user equipment for timing adjustment with the target beam based on the user equipment type. In addition, apparatus 20 may be controlled by memory 24 and processor 22 to transmit a request to the user equipment to switch from a source beam to a target beam. Further, apparatus 20 may be controlled by memory 24 and processor 22 to receive communication from the user equipment via the target beam.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for performing any of the methods described herein including, for example, means for informing a network element about a user equipment type in beam switching from a source beam to a target beam. The apparatus may also include means for, based on the user equipment type, obtaining a previous tracking timing of the target beam, or receiving a reference signal for timing adjustment with the target beam. The apparatus may further include means for receiving a request from the network element to switch from the source beam to the target beam. In addition, the apparatus may include means for switching from the source beam to the target beam. Further, the apparatus may include means for adjusting a time or frequency tracking of the target beam after the switching based on the previous tracking timing or the reference signal.

Certain example embodiments may also be directed to an apparatus that includes means for receiving an indication from a user equipment identifying a type of the user equipment in beam switching between a source beam and a target beam. The apparatus may also include means for selecting the user equipment for configuration for time tracking based on the user equipment type. The apparatus may further include means for determining whether to transmit a reference signal to the user equipment for timing adjustment with the target beam based on the user equipment type. In addition, the apparatus may include means for transmitting a request to the user equipment to switch from a source beam to a target beam. Further, the apparatus may include means for receiving communication from the user equipment via the target beam.

Certain example embodiments described herein provide several technical improvements, enhancements, and/or advantages. In some example embodiments, it may be possible to provide a method that can be applied for reducing the beam switch delay (TCI state change) even for beams switches, when the serving and the target beams have the same origin (same source—or as referred to in NR—they are configured as being QCL type D). It may also be possible to apply certain methods described herein for mTRP, ICBM, and other similar scenarios/use cases. According to some example embodiments, for the NW, one benefit may include enabling reduced beam switch delay for the non-collocated source/target beam scenario. Additionally, the NW may become aware of the beam switch delay also for a case when no additional RS is configured for reducing the TCI state switch.

According to other example embodiments, from the UE side, it may be possible to enable faster beam switching for the UE which would need additional RS for time and/or frequency tracking in the target beam when the beams' origins are not collocated. Even if the NW would not configure the necessary additional RS, the UE may benefit from the additional time allowed for time and/frequency tracking in the target beam using existing RS. Thus, this may be reflected directly in the UE requirements for beam switch.

According to certain example embodiments, if the legacy DL RS (SSB2) is repeated every 20 ms, the switch delay may be 20 ms plus the SSB processing delay. According to other example embodiments, if the additional TRS is timely transmitted in the target beam such that it occurs directly when the UE physical beam adjustment has been performed, the delay may be reduced to the time it takes to receive the RS plus the processing time of the RS. Further, if the processing is assumed to be 2 ms, a significant beam switch delay reduction may be possible.

In some cases, the delay reduction may result in additional RS overhead. However, certain example embodiments may also provide benefits in the case where the NW selects not to configure additional DL RS in the target beam (for non-collocated target scenario). In this case, the NW may be aware of the additional beam switch delay present when the beam switch involves a switch between non-collocated beams. The NW may use this information to ensure timely scheduling of the UE in the target beam such that scheduling resources are not wasted when the UE is not available for scheduling. In addition, for the type-1 UE, the NW may be able to schedule it earlier, which may result in the overall system benefiting. Furthermore, certain example embodiments may define the related UE beam switch delay requirements. For instance, the beam switch delay may need to reflect the UE type, and may depend on the presence or non-presence of additional RS in the target beam. According to other example embodiments, the methods described herein may be applicable to non-collocated mTRP, ICBM, L1/L2 mobility, and more.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the disclosure as discussed above may be practiced with procedures in a different order, and/or with hardware elements in configurations which are different than those which are disclosed. Therefore, although the disclosure has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
5GS 5G System
BS Base Station
CSI-RS Channel State Information RS
DL Downlink
eNB Enhanced Node B
gNB 5G or Next Generation NodeB
ICBM Inter Cell Beam Management
L1 Layer 1
L2 Layer 2
LTE Long Term Evolution
mTRP Multi TRP
NR New Radio
QCL Quasi Collocated
RS Reference Symbol
SSB Synchronization Block (SS, PSS, and PBCH)
TCI Transmission Control Information
TRP Transmission Point
TRS Tracking RS
UE User Equipment
UL Uplink

We claim:

1. A method, comprising:
    informing a network element about a user equipment type and capability in beam switching from a source beam to a target beam;
    receiving a request from the network element to switch from the source beam to the target beam;
    based on the user equipment type and capability, receiving a reference signal for time or frequency tracking with the target beam;
    switching from the source beam to the target beam; and
    adjusting the time or frequency tracking of the target beam after the switching based on the reference signal.

2. The method according to claim 1, further comprising:
    receiving, from the network element, configuration to perform layer 1 measurements for beam management on a first synchronization block and a second synchronization block.

3. The method according to claim 2, wherein the request to switch from the source beam to the target beam is received based on the layer 1 measurements.

4. The method according to claim 1, wherein receipt of the reference signal is triggered by the request to switch from the source beam to the target beam.

5. The method according to claim 1, wherein when the reference signal is received, the method further comprises:
    sending a sounding reference signal transmission to the network element via the target beam.

6. The method according to claim 5, wherein the sending the sounding reference signal transmission is triggered by the request to switch from the source beam to the target beam.

7. An apparatus, comprising:
    at least one processor; and
    at least one memory comprising computer program code,
    the at least one memory and the computer program code are configured, with the at least one processor to cause the apparatus at least to
    inform a network element about a user equipment type and capability in beam switching from a source beam to a target beam;
    receive a request from the network element to switch from the source beam to the target beam;
    based on the user equipment type and capability, receive a reference signal for time or frequency tracking with the target beam;

switch from the source beam to the target beam; and
adjust the time or frequency tracking of the target beam after the switching based on the reference signal.

8. The apparatus according to claim 7, wherein the source beam and the target beam are collocated.

9. The apparatus according to claim 7, wherein the at least one memory and the computer program code are further configured, with the at least one processor to cause the apparatus at least to:
receive, from the network element, configuration to perform layer 1 measurements for beam management on a first synchronization block and a second synchronization block.

10. The apparatus according to claim 9, wherein the request to switch from the source beam to the target beam is received based on the layer 1 measurements.

11. The apparatus according to claim 7, wherein receipt of the reference signal is triggered by the request to switch from the source beam to the target beam.

12. The apparatus according to claim 7, wherein when the reference signal is received, the at least one memory and the computer program code are further configured, with the at least one processor to cause the apparatus at least to:
send a sounding reference signal transmission to the network element via the target beam.

13. The apparatus according to claim 12, wherein sending the sounding reference signal transmission is triggered by the request to switch from the source beam to the target beam.

14. An apparatus, comprising:
at least one processor; and
at least one memory comprising computer program code, the at least one memory and the computer program code are configured, with the at least one processor to cause the apparatus at least to
receive an indication from a user equipment identifying a user equipment type and capability in beam switching between a source beam and a target beam;
select the user equipment for configuration for time or frequency tracking based on the user equipment type;
transmit a request to the user equipment to switch from a source beam to a target beam;
determine whether to transmit a reference signal to the user equipment for time or frequency tracking with the target beam based on the user equipment type and capability; and
receive communication from the user equipment via the target beam.

15. The apparatus according to claim 14, wherein the source beam and the target beam are collocated.

16. The apparatus according to claim 14, wherein the at least one memory and the computer program code are further configured, with the at least one processor to cause the apparatus at least to:
configure the user equipment to perform layer 1 measurements for beam management on a first synchronization block and a second synchronization block.

17. The apparatus according to claim 16, wherein the request is transmitted based on the layer 1 measurements.

18. The apparatus according to claim 16, wherein transmission of the reference signal is triggered by the request.

19. The apparatus according to claim 16, when the reference signal is transmitted to the user equipment, the at least one memory and the computer program code are further configured, with the at least one processor to cause the apparatus at least to:
receive a sounding reference signal transmission via the target beam.

20. The apparatus according to claim 19, wherein receipt of the sounding reference signal is triggered by the request.

* * * * *